(12) United States Patent
Chen et al.

(10) Patent No.: US 10,543,850 B2
(45) Date of Patent: Jan. 28, 2020

(54) REACTIVATION OF DRIVER ASSIST MODE

(71) Applicant: Ford Global Technologies, LLC, Dearborn, MI (US)

(72) Inventors: Xingping Chen, Troy, MI (US); Shane Elwart, Ypsilanti, MI (US); Bo Wu, Northville, MI (US); Jiyi Liu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 15/690,005

(22) Filed: Aug. 29, 2017

(65) Prior Publication Data

US 2019/0061778 A1  Feb. 28, 2019

(51) Int. Cl.
*B60W 50/08* (2012.01)
*B60W 30/14* (2006.01)

(52) U.S. Cl.
CPC ........ *B60W 50/082* (2013.01); *B60W 30/143* (2013.01); *B60W 2510/205* (2013.01); *B60W 2520/10* (2013.01); *B60W 2520/105* (2013.01); *B60W 2520/125* (2013.01); *B60W 2520/14* (2013.01); *B60W 2540/04* (2013.01); *B60W 2550/14* (2013.01); *B60W 2550/30* (2013.01); *B60W 2720/10* (2013.01); *B60W 2720/12* (2013.01)

(58) Field of Classification Search
CPC .............................. B60W 50/08; B60W 30/14
See application file for complete search history.

(56) References Cited

U.S. PATENT DOCUMENTS

| | | | |
|---|---|---|---|
| 5,400,864 A | 3/1995 | Winner et al. | |
| 6,226,570 B1* | 5/2001 | Hahn | B60K 28/066 701/1 |
| 7,321,818 B2* | 1/2008 | Michi | B60K 31/0008 180/169 |
| 7,965,224 B2* | 6/2011 | Kikuchi | B60W 30/17 342/54 |
| 9,114,809 B2* | 8/2015 | Huang | B60W 30/143 |
| 2005/0267684 A1* | 12/2005 | Kawakami | B62D 15/026 701/301 |
| 2015/0148985 A1 | 5/2015 | Jo | |
| 2016/0200348 A1* | 7/2016 | Lueke | B62D 1/046 701/41 |

FOREIGN PATENT DOCUMENTS

| | | |
|---|---|---|
| DE | 102011055495 B4 | 5/2013 |
| DE | 102013209242 A1 | 11/2014 |
| EP | 2613958 B1 | 11/2014 |
| FR | 3037026 A1 | 12/2016 |
| WO | 2016112946 A1 | 7/2016 |

* cited by examiner

*Primary Examiner* — Kira Nguyen
(74) *Attorney, Agent, or Firm* — Frank A. MacKenzie; Bejin Bieneman, LLC

(57) ABSTRACT

A computer that includes a processor and memory. The memory may store instructions executable by the processor. The instructions may include: following a driver-initiated trigger to deactivate a driver assist mode, to reactivate the mode when, for a dwelling period, each of a plurality of conditions equal respectively predetermined value.

17 Claims, 3 Drawing Sheets

REACTIVATION OF DRIVER ASSIST MODE

BACKGROUND

When driving for long periods of time, a driver may initiate cruise control so that the driver need not place his foot continuously on the accelerator while driving. More modern advancements include vehicle computers which may control braking, accelerating, and steering based on the roadway and the actions of surrounding vehicles.

DETAILED DESCRIPTION

Figure 1:
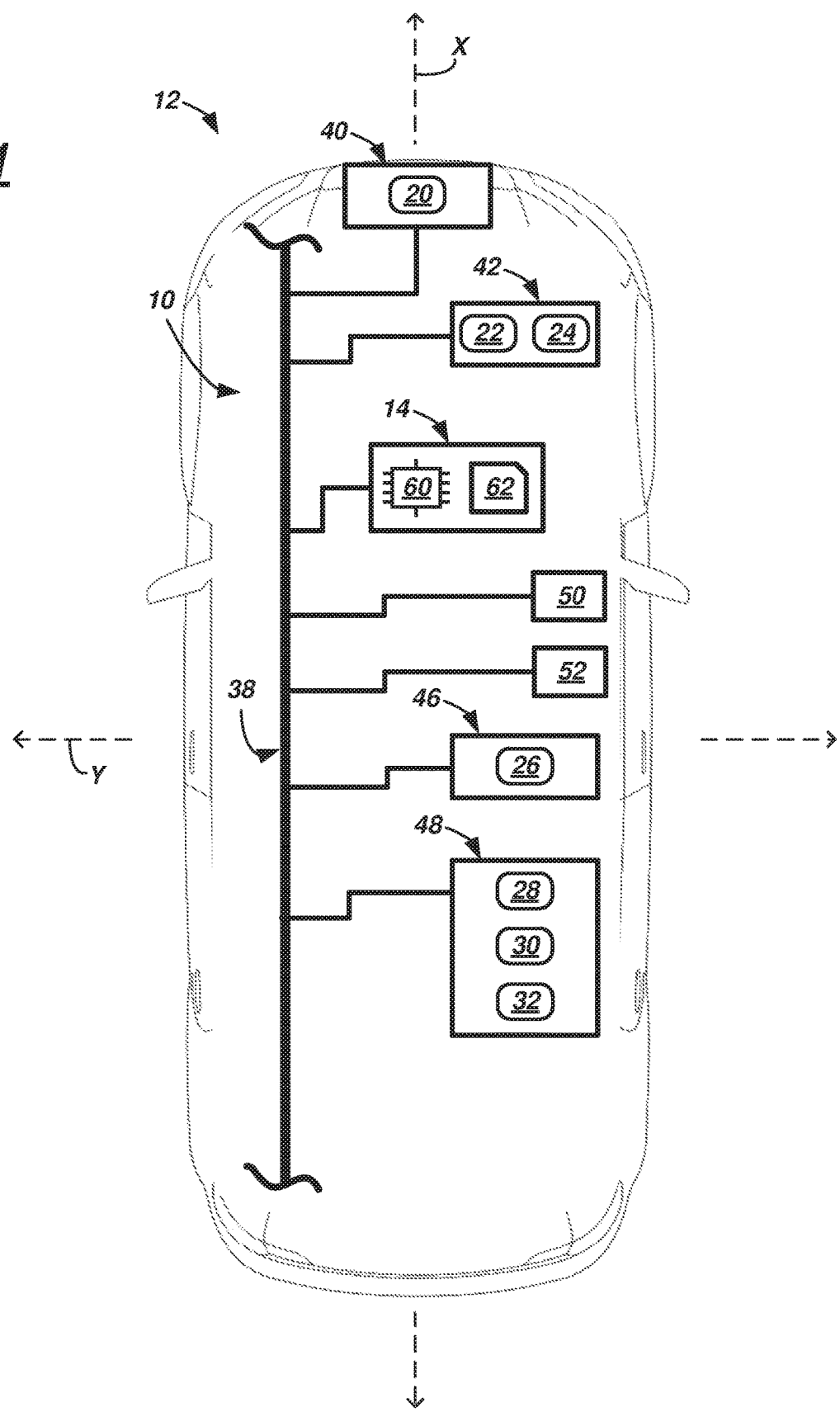
FIG. 1 is a schematic diagram of a driver assist system for a vehicle.

A driver assist system is described that includes a vehicle comprising an onboard computer programmed to reactivate a driver assist mode. The computer may include a processor and memory storing instructions executable by the processor. According to one illustrative example, the instructions include, to: following a driver-initiated trigger to deactivate a driver assist mode, reactivate the mode when, for a dwelling period, each of a plurality of conditions equal respectively predetermined values.

According to the at least one example set forth above, the plurality includes: a steering wheel rotational rate, a lateral offset, and a driver hand-engagement.

According to the at least one example set forth above, the rate is +/−15 degrees/second; the offset, with respect to roadway markings, is +/−0.6 meters, and the engagement is detected.

According to the at least one example set forth above, the plurality further comprises at least one of: a closing rate, a longitudinal acceleration, a standard deviation of lateral offset, a heading angle, and a lateral acceleration.

According to the at least one example set forth above, the plurality further comprises at least three of: a closing rate, a longitudinal acceleration, a standard deviation of lateral offset, a heading angle, a lateral acceleration value, and a vehicle speed.

According to the at least one example set forth above, the plurality further comprises each of: a closing rate, a longitudinal acceleration, a standard deviation of lateral offset, a heading angle, a lateral acceleration value, and a vehicle speed.

According to the at least one example set forth above, at least some of the values are within respectively predetermined ranges of values.

According to the at least one example set forth above, wherein the instructions further include: prior to determining the plurality, to pause for an interval.

According to the at least one example set forth above, wherein the instructions further include, to: receive an indication that a driver does not acknowledge reactivation; and prior to re-determining the plurality, pause for a larger interval.

According to the at least one example set forth above, in the driver assist mode, the computer controls longitudinal vehicle movement, lateral vehicle movement, or both.

According to another illustrative example, a method includes: using a vehicle computer, detecting a driver-initiated trigger to deactivate a driver assist mode; determining that a plurality of conditions is TRUE concurrently during a dwell period; and based on the determination, reactivating the mode.

According to the at least one example set forth above, each of the plurality are TRUE when a plurality of detected values is within a plurality of respective predetermined ranges.

According to the at least one example set forth above, the plurality comprises: a steering wheel rotational rate, a lateral offset with respect to roadway markings, and a driver hand-engagement.

According to another illustrative example, a method includes: using a vehicle computer: following a driver-initiated trigger to deactivate a driver assist mode, reactivating the mode when, for a dwelling period, each of a plurality of conditions equal respectively predetermined values.

According to the at least one example set forth above, the plurality comprises: a steering wheel rotational rate, a lateral offset, and a driver hand-engagement.

According to the at least one example set forth above, the rate is +/−15 degrees/second; the offset, with respect to roadway lane markers, is +/−0.6 meters, and the engagement is detected.

According to the at least one example set forth above, the plurality further comprises at least one of: a closing rate, a longitudinal acceleration, a standard deviation of lateral offset, a heading angle, and a lateral acceleration.

According to the at least one example set forth above, the plurality further comprises at least three of: a closing rate, a longitudinal acceleration, a standard deviation of lateral offset, a heading angle, a lateral acceleration value, and a vehicle speed.

According to the at least one example set forth above, at least some of the values are within respectively predetermined ranges of values.

According to the at least one example set forth above, in the driver assist mode, controlling a longitudinal vehicle movement, a lateral vehicle movement, or both.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Now turning to the figures, wherein like numerals indicate like parts throughout the several views, there is shown a driver assist system 10 of a vehicle 12, the system 10 comprising an onboard computer 14 which uses programming instructions and sensor data from a plurality of vehicle sensors 20-32 to determine when to reactivate a driver assist mode. As used herein, a driver assist mode comprises an at least partially autonomous driving mode of a vehicle that provides axial movement control (e.g., along a longitudinal axis X of the vehicle 12) and/or lateral movement control (e.g., along an axis Y, which is transverse to axis X, axis Y extending starboardly and portly with respect to vehicle 12). Computer 14 is programmed to determine that a plurality of driving conditions is satisfied for at least a period of time (a so-called dwelling period) before triggering a reactivation of the driver assist mode. Further, the computer 14 is programmed to avoid distracting or annoying the driver by making too many attempts to reactivate the driver assist mode before the driver is ready for reactivation. Aside from distraction, too many attempts may cause mode confusion; as used herein, mode confusion is a state of the driver's mind wherein he or she is unsure whether the driver assist mode has been reactivated or whether it is still temporarily deactivated (e.g., following a driver-initiated trigger to exit (albeit temporarily) the driver assist mode). In some cases, the driver may be aware that he or she is confused as to the present vehicle mode; in other instances, the driver may be unaware (e.g., presuming he or she knows the actual mode but in fact does not). For example, the driver incorrectly may assume that the vehicle 12 has reactivated the driver assist mode—and this incorrect assumption may result in the driver not responsively depressing the brakes, accelerating the vehicle 12, steering the vehicle 12, etc. in order to avoid a collision. Or for example, following a temporary deactivation of the driver assist mode, the driver may become temporarily distracted and forget that the driver assist mode has not been reactivated (and a collision could occur). The driver assist system 10 described herein verifies a number of criteria for a dwelling period—thereby improving the likelihood that the driver has settled into a state wherein activation of the driver assist mode is more likely to be desirable. Further, the driver may be prompted by the system 10 to acknowledge reactivation of the driver assist mode, and if the driver declines, the system 10 is configured to minimize the number of reactivation attempts to avoid mode distraction and confusion.

Vehicle 12 is shown as a passenger car; however, vehicle 12 could also be a truck, sports utility vehicle (SUV), recreational vehicle, bus, or the like that includes the driver assist system 10. Vehicle 12 may be operated in a partially autonomous mode—e.g., such as a so-called level 2, level 3, or level 4 autonomous mode, as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control (note: as used herein, the term acceleration includes instances of acceleration and deceleration). At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention. In at least one example, the driver assist mode provides level 2 autonomy; of course, this is only one example, and driver assist system 10 may operate according to other levels instead.

Vehicle 12 may comprise a wired or wireless network connection 38 that permits intra-vehicle communication between multiple electronic devices within driver assist system 10, including communication between the computer 14, an imaging system 40, a steering system 42, a positioning system 46, a vehicle motion system 48, a telematics device 50, and a human-machine interface (HMI) module 52, just to name a few. In at least one example, network connection 38 includes one or more of a controller area network (CAN) bus, Ethernet, Local Interconnect Network (LIN), a fiber optic connection, or the like. Other examples also exist. For example, alternatively or in combination with e.g., a CAN bus, connection 38 could comprise one or more discrete wired or wireless connections (e.g., between computer 14 and one or more of systems 40, 42, 46, 48, etc. and/or between computer 14 and one or more of sensors 20-32).

Computer 14 may be a single computer (or multiple computing devices—e.g., shared with other vehicle systems and/or subsystems). In at least one example, computer 14 is or is part of a collision avoidance module or a driver assist module; however, these are merely examples. Computer 14 may control vehicle acceleration, deceleration, braking, and steering in the driver assist mode. A driver of the vehicle manually may actuate the driver assist mode in some circumstances; in some examples, the computer 14 may query the driver (e.g., via the HMI module 52) whether the driver wishes to initiate. In the driver assist mode, computer 14 may control acceleration or deceleration of vehicle 12 so that the vehicle is adequately spaced from other vehicles on the roadway (e.g., providing adequate emergency or evasive-action response time)—i.e., so that vehicle 12 has an appropriate gap in between it and a vehicle located forward of it (as well as rearward of it). Further, in some driver assist modes, computer 14 may control lateral positioning by steering the vehicle 12 so that it remains within roadway markings (e.g., such as lane markers) and so that it avoids other vehicles traveling on either side of it.

As used herein, a roadway is a stretch of road adapted for motor vehicle travel. Roadways include highways, freeways, expressways, service drives, side streets, and other controlled- or limited-access roads. And as used herein, roadway markings are indicia on the roadway which indicate to a vehicle or its driver a predetermined path to follow (e.g., non-limiting examples of indicia include lane markers, symbols, text, etc.).

Computer 14 may comprise a processor 60 coupled to memory 62. For example, processor 60 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 62, which enable the computer 14, among other things, to do one or more of the following, to: determine a driver-initiated trigger to exit or temporarily deactivate a driver assist mode; determine a plurality of conditions suitable for reactivating the driver assist mode; determine whether the driver acknowledges reactivation prior to reactivating the mode; determine whether a maximum number of consecutive reactivation attempts have been made; when the maximum number is reached, terminate the driver assist mode for the duration of the ignition cycle; control the duration of temporary deactivation based on the number of activation attempts made; and when acknowledgement from the driver is received, reactivate the driver assist mode.

Memory 62 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 62 may store one or more computer program products which may be embodied as software, firmware, or the like.

Imaging system 40 may comprise one or more imaging sensors 20 which provide computer 14, in a partially autonomous mode, with situational awareness (e.g., such as roadway and roadway markings identification, traffic signal awareness, etc.) and which facilitate vehicle collision avoidance with vehicles and other obstacles. Thus, in the driver assist mode, imaging system 40 is adapted to provide suitable sensor data to computer 14 and other vehicle driving computers. In some examples, sensor data from sensor(s) 20 may be used to generate a digital three-dimensional map or representation of the environment surrounding vehicle 12. In some instances, localization data stored in memory 62 (and/or received from a remote server (not shown) via telematics device 50) may be used to enhance situational awareness and facilitate collision avoidance. Non-limiting examples of imaging sensors 20 include one or more laser identification detection and ranging (LIDAR) devices, one or more radio detection and ranging (RADAR) devices (e.g., including so-called millimeter radar), and digital cameras (e.g., complementary metal oxide semiconductor (CMOS) devices, charge-coupled devices (CCDs), image intensifiers (so-called i-squared devices), etc.), just to name a few examples.

In at least one example, sensor data from imaging sensors 20 is used by computer 14 to do one or more of the following: to determine relative vehicle position (e.g., such as lateral offset or standard deviation of lateral offset) within roadway markings (e.g., lane markers); to determine vehicle heading angle with relative to the roadway markings (e.g., lane markers); to determine a closing rate with respect to vehicle 12 and an obstacle on the roadway; and to determine the location of merging roadway lanes relative to vehicle 12. As used herein, a closing rate is, with respect to a roadway frame of reference, a speed at which vehicle 12 and an obstacle are approaching one another. As used herein, an obstacle may be another vehicle, a stationary object, a pedestrian, cyclist, another moving object, etc. Thus, the closing rate may pertain to vehicle 12 moving toward a stationary obstacle, vehicle 12 moving toward an obstacle which is moving in the same direction (however vehicle 12 is moving faster), etc.

Steering system 42 may comprise any suitable vehicle steering components which, e.g., move vehicle wheels to turn the vehicle 12. Non-limiting examples include a hand-operated steering wheel having a mechanical linkage to the vehicle wheels, steering wheels having drive-by-wire couplings, and the like; other examples also exist. According to one example, system 42 comprises one or more steering wheel touch sensors 22 which detect human contact with the steering wheel. For example, sensors could be located at 10 o'clock and 2 o'clock on the wheel and provide a detected output (indicating the driver is holding the steering wheel) when at least a predetermined surface area of the steering wheel is in contact with the driver's hands. In one example, sensors 22 may comprise resistive-touch, capacitive-touch sensors, or other proximity sensing elements. Alternatively, or in addition thereto, sensors 22 could comprise pressure-sensing elements (e.g., requiring the driver to apply a predetermined amount of pressure (or grip) to the steering wheel before electronically indicating that the driver is holding the wheel). According to one example, sensors 22 may provide sensor data to the computer 14 so that it may determine whether to reactivate the driver assist mode, as described below.

Steering system 42 further may comprise a steering wheel rotational-rate sensor 24. This sensor 24 may be located on the steering wheel, along a corresponding steering column, or elsewhere in system 42; it may detect how fast the steering wheel is being rotated (e.g., by the driver). According to one example, sensor data therefrom may be provided to computer 14 so that it may determine whether the vehicle 12 is turning, changing lanes, drifting within or across lane markers, etc., as described more below.

Positioning system 46 may comprise one or more sensors 26 used to detect terrestrial position data and/or heading data of vehicle 12. In some instances, sensor data from this system 46 may be used by computer 14 to provide relative position of vehicle 12 to other obstacles on the roadway (e.g., such as to other vehicles, barriers, sidewalks, etc.). Non-limiting examples of system 46 include Global Positioning System (GPS) and a Global Navigation Satellite System (GLONASS); further, in at least one example, sensor data from system 46 comprises differential GPS data.

Vehicle motion system 48 may comprise one or more vehicle systems which detect vehicle motion and use that data to stabilize vehicle movement, avoid collisions, etc. For example, system 48 may comprise one or more of an anti-lock braking system, an electronic stability control system, a roll stability control system, or the like. System 48 may receive a variety of sensor data, at least some of which may be provided to computer 14; non-limiting examples of sensors of system 48 include one or more acceleration sensors 28, one or more rotational-rate sensors 30, and one or more wheel speed sensors 32.

Acceleration sensors 28 (e.g., x-, y-, and z-axis sensors) may be any suitable sensor for detecting an acceleration in the X-, Y-, and/or Z-axis (e.g., the Z-axis (not shown) being a vertical axis of the vehicle 12). For example, sensor 28 may be a single tri-axis accelerometer positioned and oriented in the vehicle 12 in order to measure x-, y-, and z-accelerations in the respective X-, Y-, and Z-axes. In other examples, a separate accelerometer may be used for each of the X-, Y-, and/or Z-axes. Sensor(s) 28 may be used to determine whether the driver (e.g., following a temporary deactivation of the driver assist mode) has settled (or is stable) and is ready to reactive the mode. Settling may pertain to the driver of the vehicle 12 maneuvering the vehicle with minimal changes in acceleration or direction. In some instances, settling is determined only when vehicle speeds exceed a threshold (e.g., greater than 50 miles per hour (mph)).

Rotational-rate sensors 30 (e.g., roll, yaw, and pitch sensors) may be any suitable sensor for detecting rotational movement of the vehicle 12 about the X-, Y-, and/or Z-axes. One non-limiting example of a rotational-rate sensor 30 is a gyroscope; however, other examples exist. Thus, for example, a tri-axis gyroscope could be used, or several single-axis gyroscopes may be used. In either instance, like the acceleration sensor(s), the rotational-rate sensor(s) 30 may be aligned with the vehicle's X-, Y-, and Z-axes as well. According to one example, vehicle 12 at least comprises at least a rotational-rate sensor 30 that measures and/or calculates yaw of vehicle 12 (e.g., yaw data being used to determine or confirm lateral offset). Similar to that discussed above, sensor(s) 30 may be used to determine whether the driver (e.g., following a temporary deactivation of the driver assist mode) has settled and is ready to reactive the mode.

Wheel speed sensors 32 may measure instantaneous angular speed and may be located at one or more of the vehicle wheels. Data from these sensors 32 may be used by computer 14 to determine, among other things, whether the vehicle 12 is traveling at or above a threshold speed (e.g., suitable for the driver assist mode), a closing rate between vehicle 12 and another obstacle, etc.

Telematics device 50 may be any suitable telematics computing device configured to wirelessly communicate with other electronic devices. Such wireless communication may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art. In at least one example, telematics device 50 may receive cloud-map data which may be used by computer 14 to determine position relative to vehicle roadways, intersections, merging lanes, etc.; in some instances, this type of data may supplement position and/or heading data received from positioning system 46. More particularly, in at least one example, device 50 may provide computer 14 with cloud-map data so that computer 14 may determine its relative distance and/or position with respect to the vehicle's current roadway lane and a merging lane (i.e., any lane which is merging into said current lane). This merging data may be used by computer 14 when it determines whether to reactivate the driver assist mode, as described below. As used herein, cloud-map data comprises internet- or cloud-based digital maps stored at a server and which may be provided wirelessly to vehicle 12. Such digital maps are typically updated and maintained via the server which hosts a website, mobile software application, or the like (e.g., one non-limiting commercial implementation is Waze™).

Human-machine interface (HMI) module 52 may include any suitable input and/or output devices such as switches, knobs, controls, etc.—e.g., on an instrument panel, steering wheel, etc. of vehicle 12—which are coupled communicatively to computer 14 (e.g., also via network connection 38). In one non-limiting example, HMI module 52 may comprise an interactive touch screen or display which provides alert or notification information to the users of vehicle 12. As will be explained in greater detail below, notifications may include alerting the driver of the vehicle 12 that computer 14 intends to reactivate the driver assist mode—e.g., so that the driver is not surprised. In at least one example, the HMI module 52 is interactive permitting the driver to decline reactivation. Further, as explained more below, if computer 14 receives no indication via HMI module 52 of an acknowledgement from the driver, computer 14 may consider this lack of acknowledgement to be nonacceptance from the driver.

Figure 2:
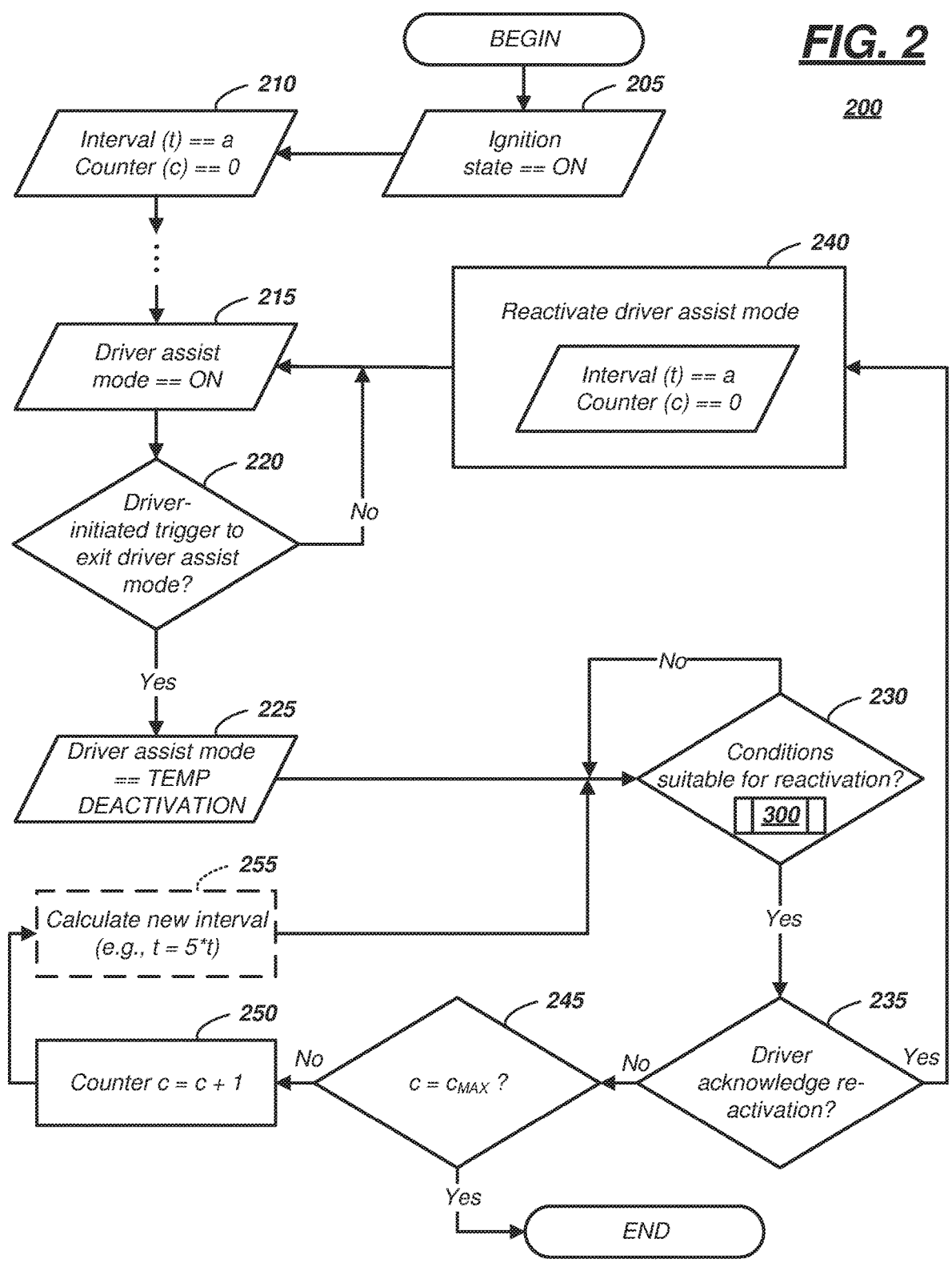
FIGS. 2-3 are flow diagrams illustrating example computer programming instructions to reactivate a driver assist mode.
Figure 3:
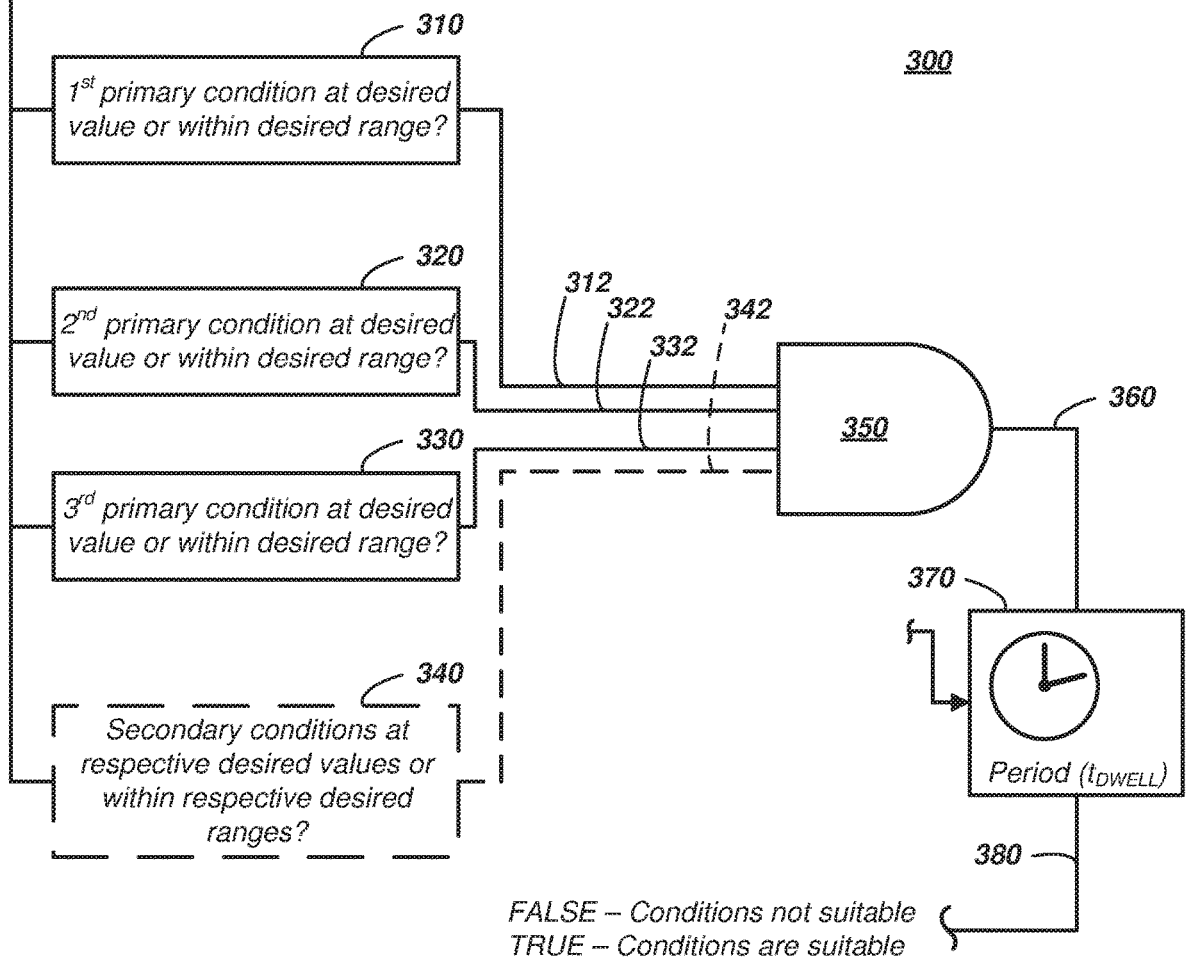

Turning now to FIGS. 2-3, a process 200 is shown for reactivating a driver assist mode in vehicle 12. As will be explained below, the process is at least suitable in instances when the driver assist mode is temporarily deactivated (e.g., by the driver). As used herein, a user deactivation of the driver assist mode (or a driver-initiated trigger to deactivate the driver assist mode) comprises a manual input by the driver to exit (at least temporarily) the driver assist mode so that the driver assumes control of the vehicle longitudinal movement and/or vehicle lateral movement. In this context, a manual input, as used herein, comprises a tactile indication provided by the driver (and ultimately to computer 14), an audible indication provided by the driver (and ultimately to computer 14) (e.g., voice control using automatic speech recognition), or a combination thereof. Non-limiting examples of tactile indications include gripping the steering wheel, rotating the steering wheel, depressing the vehicle brake pedal, depressing the vehicle accelerator pedal, depressing a switch on the vehicle steering wheel or on the HMI module 52, and the like.

According to at least one example of process 200, the driver assist mode may monitor and control only longitudinal movement (e.g., a so-called adaptive cruise control mode or ACC mode)—i.e., in this mode, the driver maintains control over lateral movement or steering of vehicle 12 while the computer 14 controls longitudinal movement. Thus, when exiting this driver assist mode, the driver assumes (or resumes) control acceleration and braking. Process 200 is described with respect to this type of driver assist mode.

According to another non-limiting example, process 200 may be executed using a driver assist mode wherein computer 14 monitors and controls both longitudinal and lateral movement (e.g., a so-called traffic jam assist mode, a so-called highway assist mode, or the like). Thus, when exiting either of these driver assist modes, the driver assumes (or resumes) control of acceleration, braking, and steering. These modes also are merely examples; other driver assist modes may be used. For example, some modes may permit computer control of lateral vehicle movement only—e.g., wherein the driver maintains control of acceleration and braking.

Process 200 may begin with block 205. In block 205, the vehicle ignition state may be ON. For example, an engine may be running, a transmission state may be in DRIVE, and the driver may be controlling both longitudinal and lateral movement of the vehicle 12.

In block 210 which follows, computer 14 may assign an interval value (t) to be a predetermined value (a). Interval (t) may be a duration of time that the computer 14 waits (following a temporary deactivation of the driver assist mode) before attempting to reactivate the mode. Non-limiting examples of value (a) include: 30 seconds, 45 seconds, 1 minute, 2 minutes, etc.

Block 210 also may comprise initializing a counter (c) (e.g., the initial counter value may be zero (0) in some cases). The counter (c) may inhibit the computer 14 from re-attempting too many times to reactivate the driver assist mode, thereby mitigating circumstances which might cause driver distraction or annoyance.

In block 215, the driver assist mode may be changed from an OFF state to an ON state. Thus, as explained in the examples above, the computer 14 may assume control of the vehicle's longitudinal and/or lateral movement. Block 215 may be triggered by any suitable event (or combination of events), including but not limited to: vehicle 12 entering an expressway other suitable roadway; vehicle 12 traveling at a predetermined minimum speed threshold; receiving an indication to enter the mode from the driver (e.g., via tactile or voice command); etc. It should be appreciated that block 215 may occur at any time following ignition state ON (e.g., even hours thereafter).

In block 220, computer 14 determines whether a driver-initiated trigger to exit the driver assist mode has been received. As discussed above, computer 14 may determine this trigger by detecting that the driver depressed the brake pedal (e.g., while computer 14 is controlling longitudinal movement of vehicle 12 in the assist mode), or by detecting that the driver rotated the steering wheel (e.g., while computer 14 is controlling at least lateral movement of vehicle 12), or the like. Of course, when the assist mode includes computer 14 controlling both longitudinal and lateral vehicle movement, a driver trigger to exit (such as depressing the brake pedal (a longitudinal input)) could turn over to the driver control of both longitudinal and lateral vehicle movement. (Similarly, if the mode included both longitudinal and lateral vehicle movement and if the computer 14 detected driver steering input (a lateral input), then the computer 14 could turn over to the driver control of both longitudinal and lateral vehicle movement as well.)

Regardless of the nature of the trigger to exit, process 200 proceeds to block 225 when the trigger is received and/or determined by computer 14. When no driver-initiated trigger is received, then block 220 loops back and repeats block 215 and then block 220 again; i.e., the driver assist mode remains in the ON state until the driver (at least temporarily) exits the driver assist mode.

In at least one example of block 225, computer 14 changes the state of the driver assist mode from ON to TEMPORARILY DEACTIVATED. As explained below, the temporarily deactivated state may be reactivated based on driving behavior and without user interaction. Following block 225, the process proceeds to block 230.

In block 230, using sensor data from one or more of sensors 20-32, computer 14 determines whether the driving behavior conditions are suitable for reactivation. According to one example, a plurality of conditions is required to reactivate the driver assist mode to an ON state. In this context and as used herein, a plurality of conditions comprises at least two of the following measurements of vehicle movement (measurable using one or more of sensors 20-32): a steering wheel rotational rate within a predetermined range; a lateral offset of vehicle 12 (with respect to roadway markings) within a predetermined range; and a detected driver hand-engagement with the steering wheel. In some examples, the plurality of conditions further comprise all three conditions set forth above and/or one or more of the following: a closing rate (with respect to an obstacle) that is less than a predetermined rate, wherein a total time to close (e.g., collision with the obstacle) is less than or equal to a predetermined value; a longitudinal acceleration within a predetermined range; a standard deviation of lateral offset within a predetermined range; a heading angle of vehicle 12 (with respect to roadway markings) within a predetermined range; a lateral acceleration within a predetermined range; a vehicle speed within a predetermined range; and a determination that another lane does not merge into the present lane of vehicle 12 for a previous period of time (e.g., fifteen seconds). Table I (shown below) illustrates a set of values each associated with respective conditions—this table pertains to a driver assist mode wherein computer 14 controls only longitudinal vehicle movement. The values are merely examples. Table II illustrates two sets of values that each correspond to the same conditions—and this table pertains to a driver assist mode wherein computer 14 controls both longitudinal and lateral vehicle movement. Again, these sets (and/or values) are merely examples. Thus, other sets and/or values may be used instead in other examples.

Furthermore, in block 230, computer 14 determines whether the plurality of conditions is satisfied concurrently for a dwelling period. Thus, as used herein a dwelling period is a duration of time in which a plurality of conditions concurrently must be TRUE (i.e., each condition must satisfy a predetermined value or be within a predetermined range). One example of a dwelling period is six seconds. For example, a value of six seconds may permit a driver (who has exited (albeit temporarily) the driver assist mode to settle into a current driving lane. In other instances, the dwelling period may be smaller or larger (e.g., three to fifteen seconds); however, if the value is too large, driver may be impatient to have vehicle 12 resume control, and if the value is too small, this may cause driver irritation. In at least one example, dwelling period may be preconfigurable by the user of the vehicle 12 (e.g., programmable via HMI module 52). In other examples, computer 14 adaptively may learn whether the driver prefers shorter dwelling periods or longer dwelling periods by repeatedly executing the process 200, and computer 14 may store this learned dwelling period in memory 62 for future uses of the driver assist system 10.

TABLE I

Driver Assist Mode (Longitudinal Vehicle Movement Only)

| | Example Condition | Example Set of Value(s) |
|---|---|---|
| (a) | Steering wheel rotational rate | +/−15 degrees/second (°/s) |
| (b) | Lateral offset (vehicle to roadway markings) | +/−0.6 meters (m) |
| (c) | Driver Hand-engagement | Detected or Undetected |
| (d) | Closing rate to obstacle | <3 meters/second (m/s) and total time to close ≤6 seconds (s) |
| (e) | Longitudinal acceleration | +/−0.15 meters/second^2 (m/s^2) |
| (f) | Standard deviation of lateral offset | +/−0.2 m |
| (g) | Heading angle | +/−2° (with respect to lane markers) |
| (h) | Lateral acceleration | +/−0.15 m/s^2 |

TABLE II

Driver Assist Mode (Longitudinal and Lateral Vehicle Movements)

| | Example Condition | Example Set I of Value(s) | Example Set II of Value(s) |
|---|---|---|---|
| (a) | Steering wheel rotational rate | +/−15°/s | +/−15°/s |
| (b) | Lateral offset (vehicle to roadway markings) | +/−0.6 m | +/−0.6 m |

TABLE II-continued

Driver Assist Mode (Longitudinal and Lateral Vehicle Movements)

| | Example Condition | Example Set I of Value(s) | Example Set II of Value(s) |
|---|---|---|---|
| (c) | Driver Hand-engagement | Detected or Undetected | Detected or Undetected |
| (d) | Closing rate to obstacle | <3 m/s and total time to close ≤5 s | <6 m/s and total time to close ≤6 s |
| (e) | Longitudinal acceleration | +/−0.1 m/s^2 | +/−0.2 m/s^2 |
| (f) | Standard deviation of lateral offset | +/−0.2 m | +/−0.3 m |
| (g) | Heading angle | +/−1° (with respect to lane markers) | +/−2° (with respect to lane markers) |
| (h) | Lateral acceleration | +/−0.1 m/s^2 | +/−0.2 m/s^2 |
| (i) | Vehicle speed | 55-80 mph | 15-85 mph |

FIG. 2 illustrates that block 230 may comprise a subroutine or process 300. One non-limiting example of this process 300 is shown in FIG. 3. Again, the conditions of Table I are used (in process 300) for explanatory purposes only.

Turning to FIG. 3, the illustration shows one example of how computer 14 may determine whether to reactivate the driver assist mode. In general, process 300 illustrates that one or more conditions may be required to be TRUE for dwelling period ($t_{DWELL}$) in order for computer 14 (in block 230) to determine that conditions are suitable for reactivation.

Process 300 begins with block 305—a timed pause, according to an interval (t), that elapses before determining whether conditions are suitable for reactivation of the driver assist mode. As discussed above, a current value of interval (t) may be the value 'a' (or 1 minute). As will be explained more below, this value may be updated during process 200. Thus, interval (t) may be predetermined and/or iteratively-determined. As used herein, an iteratively-determined interval is one in which the duration changes for at least some of the iterations. Following block 305, process 300 proceeds to blocks 310, 320, 330—and/or block 340.

According to one example, blocks 310, 320, and 330 comprise primary conditions each having a predetermined desired value (or range of values). The quantity of primary condition blocks is merely an example (e.g., in other instances, process 300 could have one, two, four, five, etc. primary conditions instead). Process 300 also illustrates a block 340 that represents instructions associated with secondary conditions; this block is optional. Similar to blocks 310, 320, 330, each of the secondary conditions of block 340 may have respective predetermined desired values (or ranges of values).

According to one example, conditions (a), (b), and (c) of Table I may be the primary conditions of blocks 310, 320, and 330, respectively. Furthermore, at least one of conditions (d)-(h) may be a secondary condition. When any of blocks 310, 320, 330, or 340 are TRUE, the respective block may provide a TRUE indication to an AND-gate 350 (e.g., via respective input 312, 322, 332, and 342). During block 230 (of process 200), these inputs may not always be TRUE concurrently (i.e., following interval (t)); however, when inputs 312, 322, and 332 are TRUE concurrently (or when block 340 is used, when inputs 312, 322, 332, and 342 are TRUE concurrently), then AND-gate 350 may provide a TRUE via an output 360. Otherwise, AND-gate 350 provides a FALSE via output 360.

Output 360 is provided to a timer or timing circuit 370 which may operate as a clock only when output 360 is TRUE. (Note: in computer 14, AND-gate 350 may be implemented using firmware or software, a discrete or integrated circuit, a combination thereof, or the like.)

Timer 370 may receive as input a TRUE or FALSE from AND-gate 350 and a dwelling period ($t_{DWELL}$). In order to provide a TRUE via output 380, timer 370 needs to determine that output 360 remains TRUE for the dwelling period ($t_{DWELL}$). Thus, timer 370 may begin timing whether the conditions of blocks 310, 320, 330, and 340 are concurrently TRUE each time process 300 is initiated (e.g., each time block 230 is re-determined). This may occur multiple times during each iteration of process 300. When timer 370 provides a TRUE, computer 14 determines, in block 230, that conditions are suitable for reactivation, and process 200 (FIG. 2) proceeds to block 235.

Thus, block 230 may occur relatively quickly following block 225 (temporary deactivation), or block 230 may use a relatively long period of time (e.g., it could take thirty or more minutes for computer 14 determine concurrency of the respective conditions of blocks 310, 320, 330, and 340). In some instances, if process 200 remains in block 230 for a predetermined duration, computer 14 may terminate the process 200 (e.g., time-out). In other examples, the process 200 continues until the concurrency occurs or the vehicle ignition state changes to OFF.

Thus, according to one illustrative example (e.g., again using Table I), in order for block 310 to provide a TRUE input to AND-gate 350, vehicle steering rotational rate must be greater than −15° and less than +15°. Similarly, in order for block 320 to provide a TRUE input to AND-gate 350, lateral offset of vehicle 12 with respect to roadway markings (e.g., lane markers) must be greater than 0.6 meters. Similarly, in order for block 330 to provide a TRUE input to AND-gate 350, driver hand-engagement of the steering wheel must be detected. Further, when optional block 340 is used, at least one of the following also must be TRUE concurrently with TRUE outputs of blocks 310, 320, 330: a closing rate must be less the 3 meters/second and a total time to close must be less than or equal to 6 seconds; a longitudinal acceleration must be greater than −0.15 meters per second squared and less than +0.15 meters per second squared; a standard deviation of lateral offset must be greater than −0.2 meters and less than +0.2 meters; a heading angle of the vehicle 12 must be greater than −2° and less than +2°; and a lateral acceleration must be greater than −0.15 meters per second squared and less than +0.15 meters per second squared. Accordingly, when each of these conditions are true for dwelling period ($t_{DWELL}$), then timer 370 returns a TRUE (and computer 14 determines that conditions are suitable for reactivation and proceeds to block 235).

It should be appreciated that, with respect to ranges, the condition may be determined to be TRUE provided the measured value (e.g., using sensor data from sensors 20-32) indicates a value within the predetermined range. Thus, continuing with the example, if measured steering rotational rate is 0° (using sensor 24), then the condition of block 310 is TRUE (e.g., since 0° is between −15° and +15°). Other conditions may be determined similarly.

In block 235 (FIG. 2), computer 14 may determine whether the driver acknowledges reactivation. According to one example, via HMI module 52, computer 14 prompts the driver to accept or decline reactivation of the driver assist mode using a visual alert, an audible alert, a tactile alert, or a combination thereof. If the driver accepts by providing a suitable indication to computer 14 (e.g., via HMI module 52 or the like), then computer 14 determines an acknowledgement (ACK) and process 200 proceeds to block 240. And if the driver does not accept (i.e., no response) or if the driver declines, computer 14 determines no acknowledgement (NO ACK) and process 200 proceeds to block 245.

In block 240, computer 14 reactivate the driver assist mode. Continuing with the current example, computer 14 reactivates the longitudinal driver assist mode, and process 200 proceeds to block 215 again (thereafter, other blocks of process 200 may be repeated). In block 240, the interval (t) and counter may be reset (e.g., t=a, and c=0, as in block 210). In this manner, delays in determining whether conditions are suitable for reactivation may be minimized, as the driver by acknowledging reactivation in block 235 appears to desire to utilize the respective driver assist mode.

Turning now to block 245—which may follow block 235, computer 14 may determine whether the counter value equals a maximum value ($c_{MAX}$) (e.g., which may be stored in memory 62 of computer 14). According to one non-limiting example, $c_{MAX}$ equal three (3); however, other values may be used instead. Continuing with the present example, c=0; therefore, the counter has not reached the maximum value. However, when the c=$c_{MAX}$, then process 200 ends; in this manner, the driver may not be distracted or annoyed with too many attempts to reactivate the driver assist mode. And when counter value (c) does not equal $c_{MAX}$, then process 200 proceeds to block 250.

In block 250, computer 14 increments the counter. Thus, c=c+1. Continuing with the instant example, counter (c) may now equal one (1). Following block 250, the process proceeds to block 255.

In block 255, computer 14 may calculate a new interval (t) using any suitable formula; i.e., computer 14 may use an iteratively-determined interval. According to one example, computer 14 uses the formula t=5*t (i.e., the new interval (t) equals five times the current interval (t)). Continuing with the present example (where t=a, and where a=1 minute), the new interval (t) now equals 5 minutes. Moreover, in this implementation, each time blocks 230, 235, 245, 250, and 255 are repeated (without reactivation, block 240), the interval (t) may increase accordingly: 1 minute (first loop), 5 minutes (second loop), 25 minutes (third loop), 125 minutes (fourth loop), etc.

Other formulas may be used instead. For example, computer 14 may utilize in block 255 the value of the counter (c)—e.g., according to the following exemplary formula: t=c*t. In this manner, each time blocks 230, 235, 245, 250, and 255 are repeated (without reactivation, block 240), the interval (t) may increase at a slower rate, such as: 1 minute (first loop; t=a=1 minute), 1 minute (second loop; t=c*t=1*1=1 minute), 2 minutes (third loop; t=2*1=2 minutes), 6 minutes (fourth loop; t=3*2=6 minutes), etc. Still other examples are also possible as well.

Block 255 is optional. Thus, in some examples, the same predetermined value of interval (t) may be used in each iteration of process 300. Regardless, following block 255, the process 200 may loop back and repeat block 230—e.g., using the current value of interval (t).

Thus, in block 230 (see again process 300), process 300 when executing block 305 may pause according to an updated interval (t) (e.g., five minutes this time). Further, the same conditions (e.g., blocks 310, 320, 330, and/or 340) may be re-determined using AND-gate 350. And timer 370 may repeat its function, as described above according to the dwell period ($t_{DWELL}$).

According to this process, computer 14 ultimately either determines that conditions are suitable for reactivation of the driver assist mode, or ends. And when reactivation occurs, the driver again could take an action that initiates the driver-initiated trigger (e.g., in block 220)—and as a result the determinations by computer 14 of blocks 230-255 may recur.

Process 200 was described with respect to the driver assist mode illustrated in Table I. It should be appreciated that the driver assist mode also could be the conditions and either of the exemplary sets of values of driver assist mode illustrated in Table II (e.g., as well as any other suitable mode). Thus, in Table II, process 200 could use the first set of values, the second set of values, or any other suitable values. Further, in such implementations, computer 14 may evaluate conditions (a), (b), and (c) as primary conditions. In one example of process 200 that requires secondary conditions, computer 14 concurrently may require primary conditions (a), (b), and (c) and all of secondary conditions (d), (e), (f), (g), (h), and (i) to be TRUE concurrently for the dwell period ($t_{DWELL}$)—i.e., all of conditions (a)-(i) of Example Set II. According to another example of process 200 that requires secondary conditions, computer 14 concurrently may require primary conditions (a), (b), and (c) and at least three of secondary conditions (d), (e), (f), (g), (h), and (i) to be TRUE concurrently—i.e., some of conditions of Example Set I.

Thus, there has been described driver assist system for a vehicle that includes a computer that is programmed to control the longitudinal movement and/or the lateral movement of the vehicle. In at least instances of driver-initiated deactivation of a driver assist mode, the computer may be programmed to determine when to reactivate the mode. To do so, the computer 14 may determine that a plurality of conditions is suitable for a dwelling period.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising:
a processor and memory storing instructions executable by the processor, the instructions comprising, to:
following a driver-initiated trigger to deactivate a driver assist mode, reactivate the mode when, for a dwelling period, each of a plurality of conditions equal respectively predetermined values,
wherein the plurality of conditions comprise at least two of: a steering wheel rotational rate, a lateral offset, or a driver hand-engagement.

2. The computer of claim 1, wherein: the rate is +/−15 degrees/second; the offset, with respect to roadway markings, is +/−0.6 meters; and the engagement is detected.

3. The computer of claim 1, wherein the plurality further comprises at least one of: a closing rate, a longitudinal acceleration, a standard deviation of lateral offset, a heading angle, and a lateral acceleration.

4. The computer of claim 1, wherein the plurality further comprises at least three of: a closing rate, a longitudinal acceleration, a standard deviation of lateral offset, a heading angle, a lateral acceleration value, and a vehicle speed.

5. The computer of claim 1, wherein the plurality further comprises each of: a closing rate, a longitudinal acceleration, a standard deviation of lateral offset, a heading angle, a lateral acceleration value, and a vehicle speed.

6. The computer of claim 1, wherein at least some of the values are within respectively predetermined ranges of values.

7. The computer of claim 1, wherein the instructions further comprise: prior to determining the plurality, to pause for an interval.

8. The computer of claim 7, wherein the instructions further comprise, to: receive an indication that a driver does not acknowledge reactivation; and prior to re-determining the plurality, pause for a larger interval.

9. The computer of claim 1, wherein, in the driver assist mode, the computer controls longitudinal vehicle movement, lateral vehicle movement, or both.

10. A method, comprising:
using a vehicle computer:
detecting a driver-initiated trigger to deactivate a driver assist mode;
determining that a plurality of conditions is TRUE concurrently during a dwell period; and
based on the determination, reactivating the mode,
wherein the plurality of conditions comprise at least two of: a steering wheel rotational rate, a lateral offset with respect to roadway markings, or a driver hand-engagement.

11. The method of claim 10, wherein each of the plurality are TRUE when a plurality of detected values is within a plurality of respective predetermined ranges.

12. A method, comprising:
using a vehicle computer:
following a driver-initiated trigger to deactivate a driver assist mode, reactivating the mode when, for a dwelling period, each of a plurality of conditions equal respectively predetermined values,
wherein the plurality of conditions comprise at least two of: a steering wheel rotational rate, a lateral offset, or a driver hand-engagement.

13. The method of claim 12, wherein: the rate is +/−15 degrees/second; the offset, with respect to roadway lane markers, is +/−0.6 meters; and the engagement is detected.

14. The method of claim 12, wherein the plurality further comprises at least one of: a closing rate, a longitudinal acceleration, a standard deviation of lateral offset, a heading angle, and a lateral acceleration.

15. The method of claim 12, wherein the plurality further comprises at least three of: a closing rate, a longitudinal acceleration, a standard deviation of lateral offset, a heading angle, a lateral acceleration value, and a vehicle speed.

16. The method of claim 12, wherein at least some of the values are within respectively predetermined ranges of values.

17. The method of claim 12, wherein, in the driver assist mode, controlling a longitudinal vehicle movement, a lateral vehicle movement, or both.

* * * * *